(12) United States Patent
Sehlleier (10) Patent No.: US 9,764,896 B2
(45) Date of Patent: Sep. 19, 2017

(54) DEVICE FOR SUCTIONING OFF WASTE PRODUCTS FROM A PRODUCTION MACHINE, COMPRISING A SUCTION ELEMENT

(71) Applicant: Windmöller & Hölscher KG, Lengerich (DE)

(72) Inventor: Thomas Sehlleier, Münster (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 14/425,639

(22) PCT Filed: Aug. 16, 2013

(86) PCT No.: PCT/EP2013/067109
§ 371 (c)(1),
(2) Date: Mar. 4, 2015

(87) PCT Pub. No.: WO2014/037207
PCT Pub. Date: Mar. 13, 2014

(65) Prior Publication Data
US 2015/0210471 A1    Jul. 30, 2015

(30) Foreign Application Priority Data

Sep. 4, 2012    (DE) ........................ 10 2012 108 198

(51) Int. Cl.
*B65F 5/00*       (2006.01)
*B29B 17/00*     (2006.01)
(Continued)

(52) U.S. Cl.
CPC .......... *B65F 5/005* (2013.01); *B29B 17/0005* (2013.01); *B29C 47/0808* (2013.01);
(Continued)

(58) Field of Classification Search
CPC ....... B65G 53/521; B65G 53/24; B65F 5/005; B29C 47/0811; B29C 47/0808;
(Continued)

(56) References Cited

U.S. PATENT DOCUMENTS 1,459,487 A * 6/1923 Witzenmann ........... F16L 11/16
138/122
2,216,864 A * 10/1940 Wasmund ............. F16L 41/025
138/DIG. 4
(Continued)

FOREIGN PATENT DOCUMENTS

CN    101033042    9/2007
DE    1237256      3/1967
(Continued)

OTHER PUBLICATIONS

Wikipedia, Metal hose.*
(Continued)

*Primary Examiner* — Alison L Hindenlang
*Assistant Examiner* — Jerzi H Moreno Hernandez (57) ABSTRACT

The invention relates a device for suctioning off waste products of the production machine comprising a suction chamber at which at least a suction element is assembled which extends into a suction space, which is outside the suction chamber in order to convey waste products into the suction chamber, wherein the suction element comprises an inlet area, which is facing the suction space and an outlet area, which ends in the suction chamber.

20 Claims, 4 Drawing Sheets

(51) Int. Cl.
  *B29C 47/08* (2006.01)
  *B29C 47/34* (2006.01)
  *B29C 47/00* (2006.01)
  *B65G 53/24* (2006.01)
  *B65G 53/52* (2006.01)

(52) U.S. Cl.
  CPC ...... *B29C 47/0811* (2013.01); *B29C 47/0877* (2013.01); *B29C 47/0894* (2013.01); *B29C 47/34* (2013.01); *B29C 47/0026* (2013.01); *B65G 53/24* (2013.01); *B65G 53/521* (2013.01); *Y02P 70/263* (2015.11); *Y02W 30/62* (2015.05)

(58) Field of Classification Search
  CPC . B29C 47/0026; B29C 47/0877; B29C 47/34; B29C 47/0894; Y02P 70/263; Y02W 30/62
  See application file for complete search history.

(56) References Cited

U.S. PATENT DOCUMENTS

| | | | | |
|---|---|---|---|---|
| 2,477,315 A * | 7/1949 | Smith | F16L 41/025 | 285/183 |
| 2,963,783 A * | 12/1960 | Field | B21C 37/28 | 285/183 |
| 3,290,066 A * | 12/1966 | Primich | F16L 43/002 | 228/144 |
| 3,425,749 A * | 2/1969 | Smith | B65G 53/521 | 406/191 |
| 3,759,580 A | 9/1973 | Ott et al. | | |
| 3,890,220 A * | 6/1975 | Anderson | B07B 9/02 | 209/250 |
| 3,924,901 A * | 12/1975 | Phillips | B65G 53/521 | 209/133 |
| 4,197,728 A * | 4/1980 | McGowen | B21C 37/121 | 138/135 |
| 4,813,103 A * | 3/1989 | Walk | D01G 7/10 | 19/80 R |
| 4,973,202 A * | 11/1990 | Becker | C03B 9/38 | 15/301 |
| 4,976,288 A | 12/1990 | Steele et al. | | |
| 5,150,990 A * | 9/1992 | Morimoto | B65G 53/525 | 406/195 |
| 5,743,575 A | 4/1998 | McFarland | | |
| 5,961,168 A * | 10/1999 | Kanno | B65G 47/91 | 294/185 |
| 2002/0114672 A1* | 8/2002 | Isozaki | B65G 53/66 | 406/11 |
| 2002/0189978 A1* | 12/2002 | Freeman | B07B 1/10 | 209/307 |
| 2011/0120022 A1 | 5/2011 | Papanikolaou et al. | | |
| 2011/0287697 A1* | 11/2011 | Mase | B07B 4/08 | 451/67 |
| 2015/0224698 A1* | 8/2015 | Sehlleier | B65G 53/42 | 406/113 |

FOREIGN PATENT DOCUMENTS

| | | | | |
|---|---|---|---|---|
| DE | 68905025 | | 9/1993 | |
| DE | 4422731 | * | 6/1994 | |
| DE | 19910513 | | 9/2000 | |
| DE | 202010014992 | | 1/2012 | |
| DE | 102011010794 | * | 8/2012 | |
| EP | 0305152 | | 3/1989 | |
| EP | 0367517 | | 5/1990 | |
| EP | 0427267 | | 5/1991 | |
| EP | 2486987 | | 8/2012 | |
| GB | 729880 | | 5/1955 | |
| GB | 729880 A | * | 5/1955 | .......... B65G 53/521 |
| IT | EP 1026107 A1 | * | 8/2000 | .......... B65G 53/521 |
| JP | 48-083575 | | 11/1973 | |
| JP | 54-016171 | | 2/1979 | |
| JP | 54-152492 | | 10/1979 | |
| JP | 01-109018 | | 7/1989 | |
| JP | 07-228305 | | 8/1995 | |
| JP | 2001-031246 | | 2/2001 | |
| NZ | WO 2013073963 A2 | * | 5/2013 | ......... B23Q 11/0075 |
| SE | WO 0076891 A1 | * | 12/2000 | .......... B65G 53/523 |
| WO | WO 02/064333 | | 8/2002 | |
| WO | WO 2005/106167 | | 11/2005 | |
| WO | WO 2009/022964 | | 2/2009 | |
| WO | WO 2014/037207 | | 3/2014 | |

OTHER PUBLICATIONS

Cuming, The secondary flow in Curved Pipes, 1952.*
Cuming, "The secondary Flow in Curved Pipes", 1955, A.R.C. Technical Report, p. 1-13.*
Martin, "Expansion and contraction losses in fluid flow", 1974, ufdcimages.uflib.ufl.edu/AA/00/00/03/83/00044/AA00000383_00044_138.pdf, p. 138-140.*
International Preliminary Report on Patentability dated Dec. 2, 2014 From International Preliminary Examining Authority Re. Application No. PCT/EP2013/067109 and Its Translation Into English.
International Preliminary Report on Patentability dated Feb. 26, 2015 From International Bureau of WIPO Re. Application No. PCT/EP2013/067178 and Its Translation Into English.
International Search Report and the Written Opinion dated Feb. 5, 2014 From International Searching Authority Re. Application No. PCT/EP2013/067178.
International Search Report and the Written Opinion dated Nov. 14, 2013 From European Patent Office Re. Application No. PCT/EP2013/067109.
Request for Examination dated Aug. 27, 2013 From the Deutsches Patent—und Markenamt Re. Application No. 102012108198.0 and Its Translation Into English.
Notification of Office Action and Search Report dated Mar. 21, 2016 From the State Intellectual Property Office of the People's Republic of China Re. Application No. 201380045984.9 and Its Summary in English.
Notification of Office Action and Search Report dated Dec. 7, 2016 From the State Intellectual Property Office of the People's Republic of China Re. Application No. 201380045984.9 and Its Translation Into English.

* cited by examiner

DEVICE FOR SUCTIONING OFF WASTE PRODUCTS FROM A PRODUCTION MACHINE, COMPRISING A SUCTION ELEMENT

RELATED APPLICATIONS

This application is a National Phase of PCT Patent Application No. PCT/EP2013/067109 having International filing date of Aug. 16, 2013, which claims the benefit of priority of German Patent Application No. 102012108198.0 filed on Sep. 4, 2012. The contents of the above applications are all incorporated by reference as if fully set forth herein in their entirety.

FIELD AND BACKGROUND OF THE INVENTION

The invention relates to a device for suctioning off waste products of a production machine comprising a suction chamber at which at least one suction element is assembled, which extends into a suction space located outside the suction chamber in order to convey waste products in the suction chamber, wherein the suction element comprises an inlet area facing the suction space and an outlet area, which ends in the suction chamber. Moreover, the invention relates to a production machine, which comprises the previously described device.

From the state of the art diverse suction devices are known in order to suctioning off waste products from a production machine. For example, suction pipes are in use which serve as suction elements wherein the pipes can be manually adjusted in its position in order to be able to effectively extract accumulating waste products at a production machine. These pipes flow into a main pipe in which a negative pressure is produced by a fan. Disadvantageously, in this main pipe partly problematic geometries occur. Moreover, disadvantageously with the known suction device irregular velocity and pressure fields in the main pipe occur and in the single suction elements, which is not desired or has to be avoided, since for example the risk exists that the suction device can be blocked by the waste products, or that the occurring waste products cannot be reliably sucked from the production machine, particularly from the suction space.

SUMMARY OF THE INVENTION

The object of the present invention is to avoid said disadvantages, particularly to establish a device of said manner, which reliably suctioning occurring waste products off the production machine, wherein at the same time a blocking addiction within the suction device is reduced.

The object of the present invention is solved by all features of claim 1. In the depending claims advantageous embodiments are described.

According to the invention it is intended that the suction element comprises a circumferential wall, which is configured with such a curvature that during the suctioning within the outlet area spaced to the wall a middle negative pressure zone occurs, which comprises a lower negative pressure than the negative pressure which develops in an external negative pressure zone between the middle negative pressure zone and the wall wherein the waste products within the suction element flow through mainly in the middle and a contacting of the waste products at the wall can be minimized. By the configuration of a middle negative pressure zone in the outlet area of the suction element, which ends in the suction chamber a blocking addiction during the suction of the device according to the invention can be reduced. Surprisingly, it has been shown that due to the middle negative pressure zone, which is surrounded by the external negative pressure zone or which is located between the establishing external negative pressure zones the waste products flow through the suction element almost in the middle particularly through the area of the suction element facing the suction chamber without essentially contacting the wall of the suction element. The external negative pressure zone facing the circumferential wall can vary in its height or size. However, the negative pressure of the middle negative pressure zone is lower compared to the negative pressure of the external negative pressure zone, which leads to the fact that the waste products preferably flow through the middle negative pressure zone, which is established in the outlet area of the suction element.

Moreover, it can be an advantage that the wall of the suction element comprises an inner wall and an outer wall wherein the inner wall ends mainly tangentially at the outlet area at the suction chamber. An advantage of the tangentially shaped inner wall is that an external negative pressure region or negative pressure zone is avoided at a wall in the outlet area or just before the aperture in the suction chamber wherein a blocking addiction would be increased.

A procedure improving the invention can intend that the inner wall comprises the course of a segment of a circle, which particularly comprises a defined radius. The geometry of the inner wall promotes the curvature of the suction element, wherein advantageous flow effects for the waste products arise within the suction element.

For example, the outer wall can comprise a means, which increases a flow resistance within the suction element wherein at the outlet area the negative pressure of the outer negative pressure zone can be reduced in the area of the inner wall. It has been shown that in the area of the inner wall a greater blocking addiction can exist wherein it can be fluidically counteracted via an introduction of a flow resistance at the external wall so that the value of the negative pressure of the external negative pressure zone in the area of the inner wall can be essentially reduced. Utilising this effect experiments have revealed that the waste products almost flow through the middle negative pressure zone without that a damaging contacting of the waste products at the wall occurs particularly at the inner wall of the suction element.

By the embodiment of the suction element according to the invention with its inner and its outer wall the middle low pressure zone, which is included by the external low pressure zone, results in the outlet area during the operation or during the suction of the waste products which accumulate in the production machine.

Concerning the means, which increases the flow resistance within the suction element it is possible that said means is intended at the side of the external wall facing the outlet area. For example, multiple means can be intended at the external wall or the external wall can be configured with one or diverse means in order to increase the flow resistance within the suction element wherein at the outlet area the negative pressure of the external negative pressure zone can be decreased in the area of the inner wall.

Advantageously, the means can extend into the interior of the suction element in a way that the cross section of the suction element narrows between the inlet area and the outlet area wherein particularly based on the narrowed area to the outlet area the cross section increases again. For example, it can be intended that the means is configured as an aperture, which is assembled within the suction element or at the outer wall. Moreover, it can be intended that multiple apertures are intended within the suction element, which comprise a defined space towards one another. By the use of one or multiple apertures the negative pressure at the inner wall in the outlet area of the suction element can be effectively reduced wherein an advantageous deflection of the waste products through the middle negative pressure zone results, which results between the walls.

Moreover, it is possible that means being applied for the increase of the flow resistance within the suction element are configured as a wall, which is tilted towards the inlet area. Advantageously, the means can be configured as a planar wall, which comprises an even area. Alternatively, the means can be configured as a curved wall towards the inner area of the suction element. The inclination of the even wall or the curved wall towards the inlet area can comprise an angle α which is in the area between 20°≤α≤70°. It is particularly advantageous when the inclination α is between 30°≤α≤50°. From experiment results said inclination angles α have been resulted as particularly advantageous in order to ensure a reliable transport of the waste products from the suction space in the suction chamber.

Moreover, the invention can also comprise that the inlet area and/or the outlet area of the suction element comprise a round cross section and/or a rectangular cross section and/or a squared cross section. Advantageously, it has been shown that the suction element is configured with a pipe between the inlet area and the outlet area, wherein particularly the pipe comprises a round cross section and/or a rectangular cross section and/or a squared cross section. Said cross section shapes have the advantage that in the interior no rotation of the pouring in waste products occur. This has the effect that the waste products during the suctioning are mainly kept in the middle or in the middle negative pressure zone of the suction element and it is avoided that the waste products are attaching to the inner wall within the suction element and possibly remain there which would be in a conjunction with a harmful blocking. Advantageously, the pipe connects the inlet area with the outlet area wherein the pipe can comprise different geometric forms and/or extensions like for example a straight, a continuous or uncontinuous curved, a continuous or uncontinuous bended, staged extension. Said forms/extensions can be combined with one another for example that the pipe has partly a straight and partly a curved extension.

In another advantageous embodiment of the invention the suction element can be a flexible component from metal wherein particularly the flexible component can be configured from four metal band elements, which are assembled with one another. The four metal band elements can advantageously be positively connected to another. For example, a laser welding connection is advantageous, since this connection causes a reliable tightness.

Moreover, the invention can comprise that a sealing means is assembled at the suction chamber and closes the suction chamber wherein particularly the suction element with its outlet area extends through the sealing means. Advantageously, the sealing means is airtight so that the throughput of the suction device is not negatively disturbed or influenced. Moreover, it can be advantageous that the sealing means comprises an opening for the suction element so that at least partially the suction element extends through the opening of the sealing means. In the area of the opening it is advantageous that the sealing means contacts at the suction element so that at this area a sealing exists.

Moreover, the invention can comprise that the suction element is moveable along the sealing means wherein the position of the suction element is variably adjustable at the suction chamber. Particularly advantageous is that the suction element can be variably moved and adjusted in its position at the suction chamber in order to be flexibly applied in different production machines. This means that the position of the suction element can be positioned corresponding to the place where the waste products of the production machine accumulate. At the same time the sealing means serves for the fact that independent from the position of the suction element a reliable sealing of the suction chamber is ensured so that the throughput of the suction device is not negatively disturbed or influenced by the position of the suction element. Thereby blockings within the suction chamber can be effectively avoided since particularly independent from the position of the suction element the sealing element ensures a sealing of the suction chamber.

Thereby that the suction element can be individually adjusted in its position relative to the suction chamber the suction chamber can comprise a suspension at which the suction element is moveably mounted. For example, it is possible that the suspension is configured as a rail system. For example, it can be possible in an embodiment of the invention that the suction element can be displaced in a linear matter along the suction chamber.

A procedure improving the invention can intend that the suction element is displaceable along the sealing means wherein during the movement of the suction element the position of the opening of the sealing means moves along. This means that during a movement of the suction element areas of the sealing means which were closed before open and thereby provides a corresponding opening for the suction element. At the same time the opening of the sealing means closes through which the suction element previously reached through.

In another advantageous embodiment of the invention the suction chamber comprises a narrowed distribution in its cross section wherein the cross section of the sealing chamber is greater at the side facing the suction unit as the cross section at the side facing away from the suction unit. This embodiment can be particularly advantageous if multiple suction elements are assembled at the suction chamber. Hereby it is achieved that in the suction chamber an even flow is produced during the operation of the device according to the invention. In this context it has been shown that a conical configuration of the suction chamber is an advantage. This conical geometry avoids that the flow rate between the single suction elements extremely sinks. Further, it is effectively avoided that disturbing flow vortex are built in the suction chamber and in the suction elements.

Moreover, the device according to the invention is enhanced in a way that the suction element comprises a foot, which is assembled underneath a sealing means. The suction element is mainly assembled outside the suction chamber and the foot is mainly assembled underneath the sealing means within the suction chamber wherein particularly the foot can be configured planar and rests at the inner wall of the suction chamber at the sealing means. The foot and the outlet area of the suction element can be connected to one another in a form-fitting, force-fitting or positive-fitting way. It is for example possible that the outlet area of the suction element is welded or screwed with the foot. The foot can be configured as a plate wherein at the same time the foot can comprises a certain sealing function, since it is assembled underneath or above the sealing means and precisely at the area of the opening through, which the suction element extends in the suction chamber it is additionally arranged that the suction chamber is sealed from the surrounding. The foot can also serve as a guidance for the suction element when the suction element is moveably mounted along the suction chamber.

Alternatively, it is possible that the suction element is stiff, immobile assembled at the suction chamber. With this embodiment the use of the sealing means is not necessarily required.

In dependence from the production machine it can be advantageous that a plurality of suction elements is assembled at the suction chamber. Advantageously, the suction element can be removably mounted at the suction chamber which has the advantage that during maintenance the suction element can be uncoupled or disassembled from the suction chamber without large assembly times.

With the production machine it can be a machine for the production of flexible packaging. It is possible that the production machine is one of the following machines: Blown film and cast film facility, flexo printing and gravure printing press, machine for the refinement and processing of paper, film and synthetic fabrics, packaging machine. In such production machines it generally occurs that the to be produced flexible packaging has to be trimmed via cutters. Hereby, waste products arise which are suckable by the device according to the invention. It has been shown that the device according to the invention particularly is suited for machines, which produce films. The sucking device according to the invention is able to effectively remove production residues (=waste products) from the producing machine. The waste products can advantageously be continuously forwarded to a waste collection area. Since the waste products can vary in their surface conditions, can particularly be sticky or stump or smooth, it is necessary that an optimal flow within the suction chamber and within the suction element is achieved by the device according to the invention. This is achieved by the previously described procedures so that a reliable suctioning of the suction space is achieved without the fact that the waste products cause a blocking within the suction chamber or the suction elements.

Advantageously, the waste products comprise stripe like and/or elongated and/or narrow extensions wherein the waste products are configured from plastic and/or paper and/or a film. Further, the waste products can also be continuous stripes, which accumulate in the production machine.

Moreover, the previously described object of the invention can be solved by a production machine with a device for suctioning of waste products wherein the device comprises the following features:
 a suction chamber at which at least one suction element is assembled, which extends in a suction space external of the suction chamber in order to convey waste products in the suction chamber,
 wherein the suction element comprises an inlet area, which is facing the suctioning space and an outlet area which ends in the suction chamber.

According to the invention the suction element comprises a circumferential wall, which is configured with a curvature in a way that during the suctioning a middle negative pressure zone results in the outlet area spaced to the wall, which comprises a lower negative pressure than a negative pressure, which is generated at the external negative pressure zone between the middle negative pressure zone and the wall wherein the waste products within the suction element flow through mainly in the middle and a contact of the waste products at the wall can be minimized. Here, also the advantages occur, which are already described for the device according to the invention.

It has been shown that the integration of the device according to the invention into an existing production machine is very important wherein the position of the suction device has to be chosen in a way that no other control elements are disturbed or covered. Moreover, it has to be ensured that a reliable suctioning of the waste products which occur in the production machine is ensured. Therefore, a positioning gear can be intended which enables a horizontally and/or vertical position displacement of the suction device according to the invention at the production machine.

BRIEF DESCRIPTION OF THE SEVERAL VIEWS OF THE DRAWING(S)

Further advantages, features and details of the invention result from the subsequent description, in which with reference to the drawings embodiments of the invention are described in detail. Thereby, the features described in the claims and in the description can be each single for themselves or in any combination be essential for the invention. It is shown.

DESCRIPTION OF SPECIFIC EMBODIMENTS OF THE INVENTION

Figure 1:
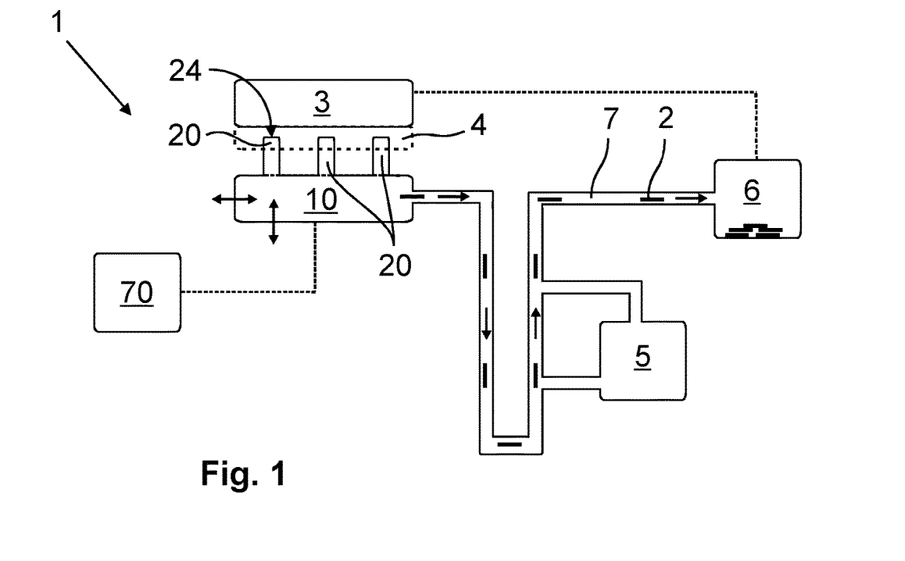
FIG. 1 a schematic drawing of a production machine with a suction device,
 FIG. 2 a possible embodiment of a suction device which is installable according to FIG. 1,
 FIG. 3 a lateral view of a suction element of the suction device according to FIG. 1,
 FIG. 4 another embodiment of a suction element according to FIG. 1,
 FIG. 5 another embodiment of a suction element according to FIG. 1,
 FIG. 6 another alternative of a suction element according to FIG. 1,
 FIG. 7 another embodiment of a possible suction element according to FIG. 1,
 FIG. 8 a further embodiment of a suction element according to FIG. 1,
 FIG. 9 an even further embodiment of a possible suction element according to FIG. 1,
 FIG. 10 another embodiment of a suction element according to FIG. 1 and
 FIG. 11 another embodiment of a possible suction element according to FIG. 1.

FIG. 1 shows the device 1 for suctioning of waste products 2 of a production machine 3. The production machine 3 can be a machine for the production of flexible wrapping, in which waste products 2 occur during the production, which have to be removed from the production machine 3 since otherwise potential disturbances during the production or during the operation of the production machine 3 can occur. By the production machine 3 it can be a blown film and a cast film facility, flexo printing and gravure printing press, a machine for the refinement and processing of paper, film and synthetic fabrics or a packaging machine. The waste products 2 can consist of plastic or paper. Hereby, the surface composition of these waste materials 2 can vary. For example, it is possible that the waste products 2 are sticky and/or stump and/or even.

In order to convey these waste products 2 target oriented from the area of the production machine 3 a device 1 for suctioning of these waste products 2 is intended, which projects with the majority of suction elements 20 in a suction space 4 of the production machine 3. It is a suction unit 5 intended which generates a low pressure within the suction chamber 10, which is current like connected with the suction element 20. Due to the generated negative pressure in the suction chamber 10 accumulating waste products 2 can be efficiently sucked within the suction space 4. The suction chamber 10 is connected to a pipe system 7, which communicates with a blower 5. Moreover, a collecting tray 6 is intended, in which the waste products 2 are collected. For example, it is possible that the waste products 2 collected in the collecting tray 6 are automatically redelivered to the production process of the production machine 3, which is schematically indicated with a dotted arrow according to FIG. 1.

Moreover, a positioning gear 70 can be intended, which is in a mechanical positive connection with the device 1 particularly with suction chamber 10 in order to achieve an ideal position at the production machine 3. The positioning gear 70 is able to adjust the device 1 horizontally and/or vertically at the production machine 3 and moves the single suction elements 20 in the desired positions.

The device 1 according to the invention offers the possibility to assemble a majority of suction elements 20 at the suction chamber 10 in order to individually achieve an ideal suctioning of the accumulating waste products 2 for each possible production machine 3.

Figure 2:
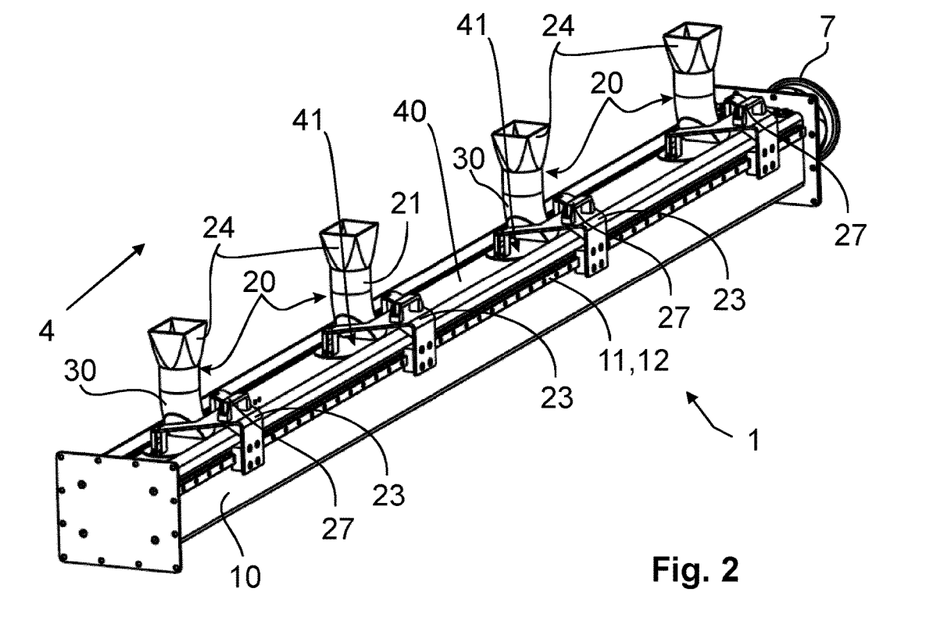

According to FIG. 1 three suction elements 20 are shown as an example, which are stationary assembled at the suction chamber 10. Likewise, it is possible that the suction elements 20 are displaceable along the suction chamber 10, which is shown in FIG. 2. Herein, the suction element 20 comprises a carriage 23, which attaches at the suspension 11. The suspension 11 is configured as a rail system 12, which is assembled outside the suction chamber 10.

The suction chamber 20 according to FIGS. 1 and 2 can comprise different geometries, which are shown for example in FIG. 3 to FIG. 11, which is subsequently described in detail. In all embodiments the suction element 20 comprises a curvature, which is not visualized in FIG. 1 due to a simplification.

According to all embodiments the suction element 20 comprises a curved distribution 21 According to all embodiments the suction element 20 comprises a curvature wherein the suction element 20 comprises an inlet area 24 which is extending in the suction space 4 and an outlet area 28 which is directed in the direction of the suction chamber 10 and ends there wherein the outlet area 28 is tangentially directed to the suction chamber 10.

In all embodiments the suction chamber 20 comprises a circumferential wall 30, which comprises such a curvature that during the suction in the outlet area 28 a middle negative pressure zone 51 occurs spaced to the wall 30, which comprises a lower negative pressure than the negative pressure, which occurs in the external negative pressure zone 52 between the middle low pressure zone 51 and the wall 30. Hereby, it is achieved that the waste products 2 flow through within the suction element 20 mainly in the middle and a contact of the waste products 2 at the wall 30 can be reduced.

The wall 30 of the suction element 20 comprises according to all embodiments an inner wall 31 and an outer wall 32 wherein the inner wall 31 ends mainly tangentially at the outlet area 28 at the suction chamber 10. Herein, the inner wall 31 comprises a distribution of a segment of a circle, which has a defined radius. The outer wall 32, which is on the opposite of the internal wall 31, comprises a means 60 which increases the flow resistance within the suction element 20 during the suction process. It has been shown that hereby the negative pressure of the outer negative pressure zone at the outlet area 28 can be reduced in the area of the inner wall 31. This area has the reference sign 8. Thereby, a middle negative pressure zone 51 is adjusted, which is covered or surrounded by an external negative pressure zone 52 at the outlet area 28. The means 60 for increase of the flow resistance extends into the interior of the suction element 20 according to all embodiments in way that the cross section of the suction element 20 is narrowed between the inlet area 24 and the outlet area 28. Starting from the narrowed area the cross section of the suction element 20 is increased towards the outlet area 28.

Figures 3, 4:
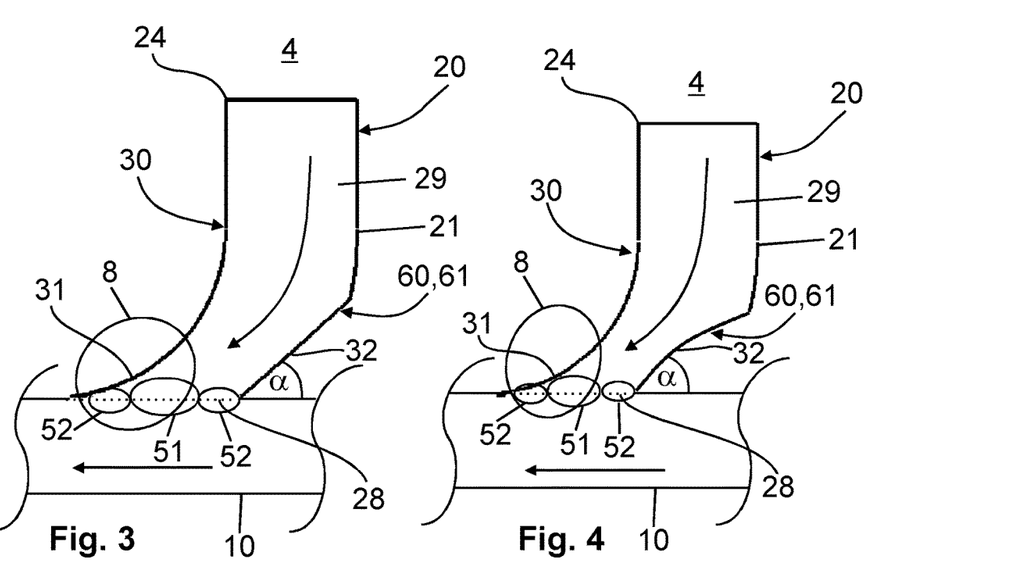
Figures 5, 7:
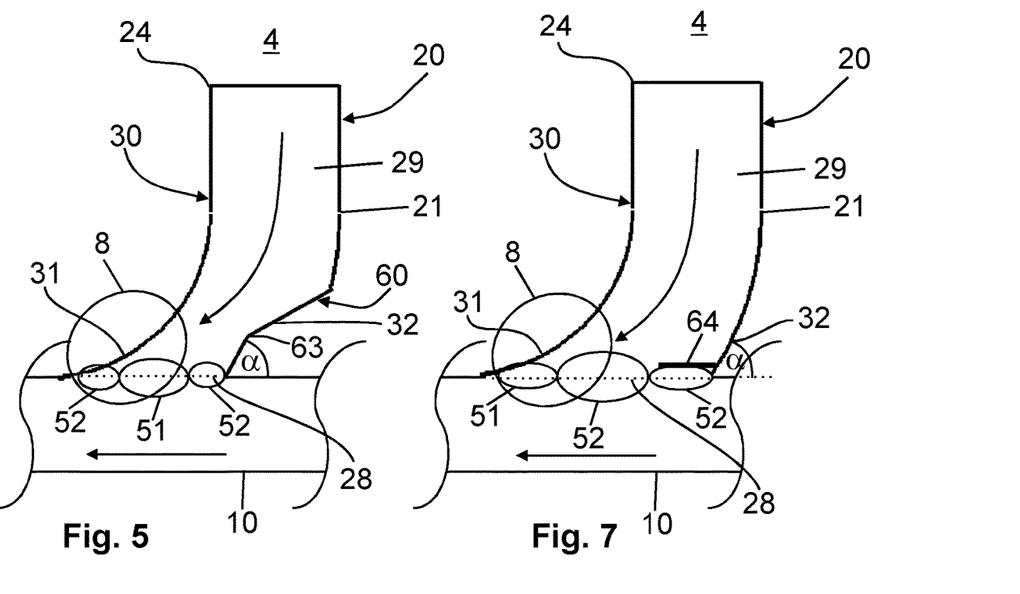
Figure 6:
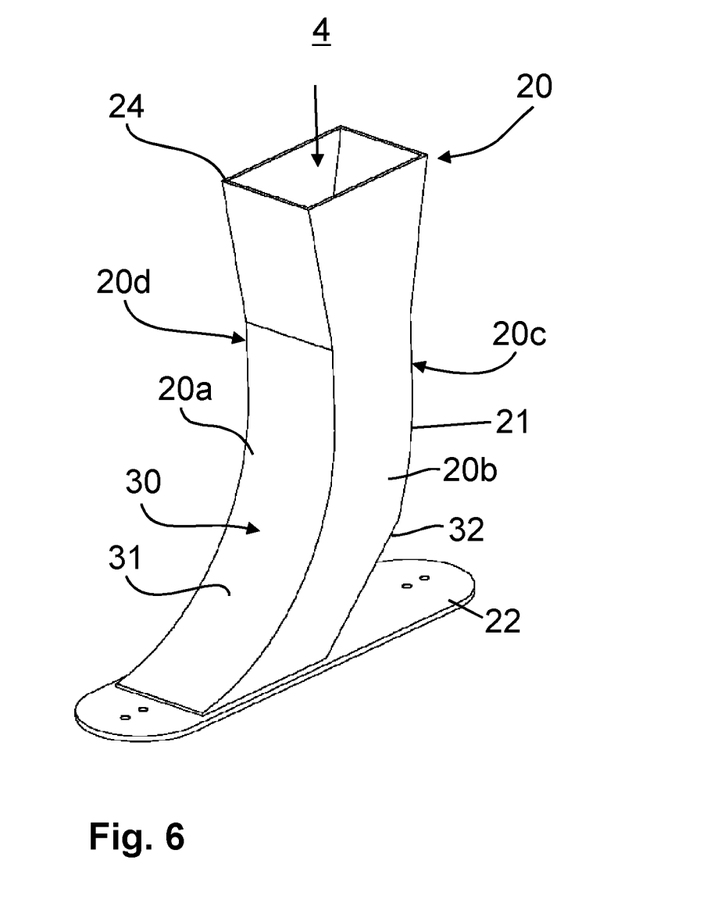

According to FIG. 3 to FIG. 5 the means 30 is configured as a wall 61, 62. In FIG. 3 the means 60 is a planar wall 61, which comprises a tilting a towards the outlet area 28. The angle $\alpha$ is in the shown embodiment preferably between 30° and 50°. According to this requirement concerning the room characteristics in the production machine 3 the tilting angle can further vary.

According to FIG. 4 the means 60 is configured as a curved wall 62 which extends into the inner area 29 of the suction element 20. This ball-like configuration of the wall 62 promotes as the means 60 according to FIG. 3 and FIG. 5 that a reduction of the negative pressure in the area 8 occurs so that an external negative pressure zone 52 is adjusted during the suction which is bigger than the middle negative pressure zone 51 whereby the waste products 2 flow mainly in the middle through the suction element 20 particularly through the middle negative pressure zone 51 and reliably reach into the suction chamber 10.

According to FIG. 5 the means 60 is edged at the outer wall 32 in the area 63 wherein a similar flow effect is achieved within the suction element 20, which is already described according to FIG. 3 and FIG. 4.

Figures 8, 9:
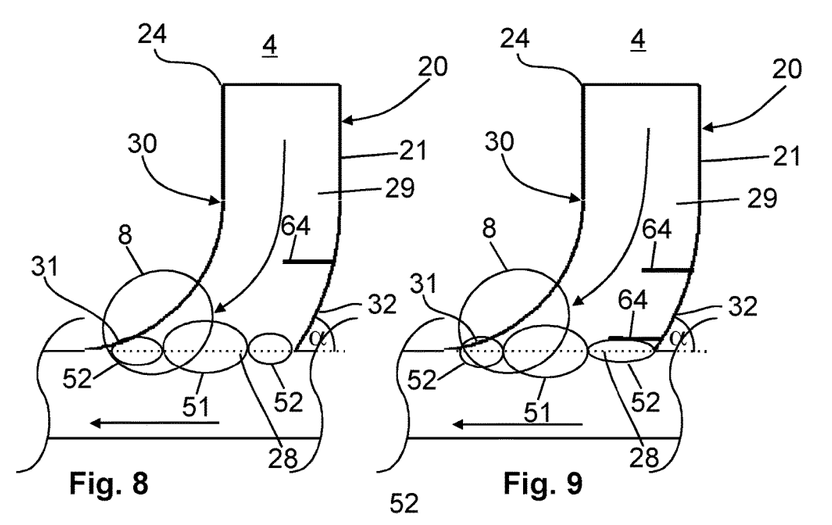

According to FIG. 7 to FIG. 9 the suction element 20 comprises one or multiple apertures 64 which are assembled at the outer wall 32 and reach into the inner areas 29 of the suction element 20. These apertures 64 cause a similar effect concerning the flow as also described in FIG. 3 to FIG. 5. The apertures 64 increase the flow resistance within the suction element 20, wherein in the area 8 the negative pressure at the outer negative pressure zone 52 is reducible in the area of the inner wall 31. Here, also the already described middle negative pressure zone 51 is adjusted, which is surrounded by the external negative pressure zone 52 wherein the middle negative pressure zone 51 comprises a smaller negative pressure than the negative pressure, which exists at the outer negative pressure zone 52. This naturally only applies during the suction procedure. According to FIG. 7 the aperture 64 is arranged near to the outlet area 28 of the suction element 20. According to FIG. 8 the aperture 64 comprises a defined distance to the opening of the suction element 20 in the suction chamber 10. According to FIG. 9 two spaced apart apertures 64 are assembled at the outer wall 32. The position of the upper aperture 64 corresponds mainly to the position of the aperture from FIG. 8. The position of the lower aperture 64 mainly corresponds to the position of the aperture according to FIG. 7.

Figure 10:
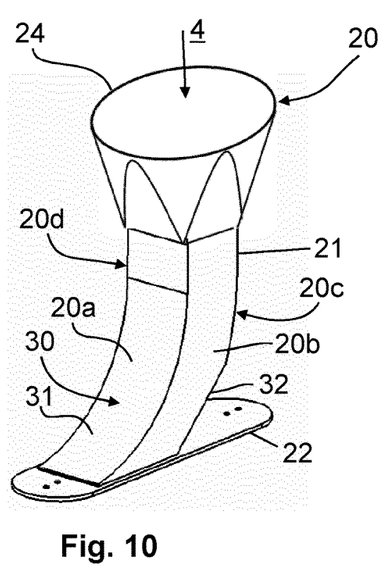

The inlet area 24 and the outlet area 28 can comprise different geometries in the cross section. For example, it is possible that according to FIG. 10 and FIG. 11 the inlet area 24 is shaped funnel-like, which means that the inlet area 24 comprises an increasing cross section towards the suction space 4. Hereby, the cross section can be round, oval, rectangular or squared wherein in this connection it is particularly regarded to FIG. 2, FIG. 10 and FIG. 11. Between the inlet area 24 and the outlet area 28 a pipe 21 can be assembled at the suction element 20, which can comprises a round cross section which is for example shown in FIG. 2 to FIG. 5 and in FIG. 11. This cross section is however not related to the area where the means 60 is assembled for flow resistance increase. The pipe 21 can also have a rectangular or squared cross section, which is shown in FIG. 10. The suction element 20 according to FIG. 10 is herein a flexible component from metal wherein the flexible component is configured from four metal band elements 20*a*, 20*b*, 20*c*, 20*d*, which are welded to one another. Previous to a welding a corresponding pressing procedure can occur wherein the single metal band elements 20*a*, 20*b*, 20*c*, 20*d* are bended in the corresponding form previous to the welding.

Figure 11:
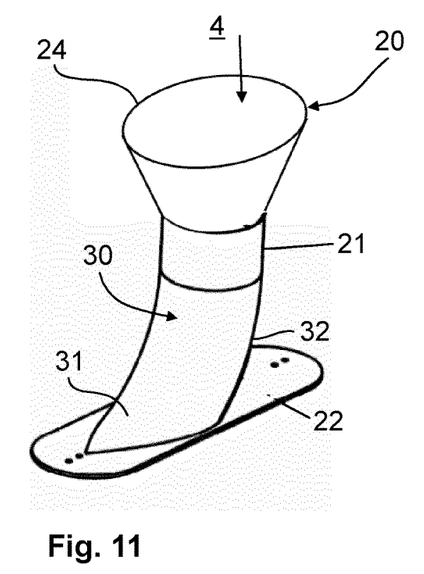

According to FIG. 10 and FIG. 11 it is obvious that the suction element 20 comprises a foot 22. In order to ensure a suction the foot 20 comprises a corresponding opening in the outlet area 28 that the waste products 2 can reach from the suction space 4 through the suction element into chamber 10. The foot 22 can for example serve as an attachment means correspondingly attaching the suction element 20 at the suction chamber 10.

According to FIG. 2 a sealing means 40 is intended, which mainly closes the suction chamber from the outer area. The sealing means 40 is due to the displacement of the suction elements 20 an advantage. For example, the foot 22 from FIGS. 10 and 11 can additionally serve as a guidance aid according to FIG. 2 during the movement of the sealing means 40 along the suction chamber 10. Advantageously, the foot 22 is assembled underneath the sealing means 40. The sealing means 40 only comprises an opening 41 in the area of the respective suction element so that at least partially the suction element 20 extends through the opening 41 of the sealing means 40. User friendly each suction element 20 can be displaced along the sealing means 40 wherein during the movement of the suction element 20 the position of the opening of the sealing means 40 moves along. Hereby, different embodiments of the sealing means 40 are possible, which is not described in detail. The sealing means 40 can for example comprise a zipper, a hook-and-loop fastener, magnetic bands, folding segments, zip lock or a roller blind sealing, which during the movement of the suction element 20 effects an opening and closure of the sealing means 40 at the same time.

The suction chamber 10 can comprise a round cross section or a rectangular cross section which is shown in FIG. 2. In order to achieve a satisfactory negative pressure during the operation within the suction chamber 10, the suction chamber 10 comprises a narrowed distribution in its cross section, which in this connection can also be named as conical. The cross section of the suction chamber 10 at the side facing the suction unit 5 is greater as the cross section at the side facing away from the suction unit 5. Hereby it is aimed that almost all suction elements 20, which are connected in series comprise the same suction power.

The carriage 23 according to FIG. 2 comprises a handle 27 so that the position of the suction element 20 in the suction space 4 is manually adjustable. The position of the carriage 23 can be arrested by a not explicitly shown arresting device. Likewise, it can be intended that a gear, which is not explicitly shown automatically adjusts the position of the carriage 23.

Here it should be mentioned that the schematically shown negative pressure zones 51, 52 can vary in their size and/or form.

Likewise, it is to be added according to the wall 30 that the inner wall 31 and the outer wall 32 are of one piece, of one material and can build a monolithic component.

REFERENCE LIST 1 device
2 waste product
3 production machine
4 suction space
5 suction unit
6 collecting tray
7 pipe system
8 area
10 suction chamber
11 suspension
12 rail element
20 suction element
20*a* metal band element
20*b* metal band element
20*c* metal band element
20*d* metal band element
21 pipe
22 foot
23 carriage
24 inlet area
27 handle
28 outlet area
29 inner area
30 wall
31 inner wall
32 outer wall
40 sealing means
41 opening
51 middle negative pressure zone
52 external negative pressure zone
60 means
61 wall
62 wall
63 edge
64 aperture
70 positioning gear

What is claimed is:

1. Device (1) configured to suction waste products (2) of a production machine (3), which are configured as continuous stripes, with a suction chamber (10) at which at least a suction element (20) is assembled which extends into a suction space (4) which is outside the suction chamber (10) in order to convey waste products (2) into the suction chamber (10), wherein the suction element (20) comprises an inlet area (24), which is facing the suction space (4) and an outlet area (28), which ends in the suction chamber (10)

characterized in that the suction element (20) comprises a circumferential wall (30) that interfaces with the suction chamber (10) tangentially over a first portion of the circumferential wall (30) facing an upstream direction of flow through the suction chamber (10) and that interfaces with the suction chamber (10) at an angle between 20-70 degrees over a second portion of the circumferential wall (30) facing a downstream direction of flow through the suction chamber (10), wherein the portion of the circumferential wall (30) facing an upstream direction of flow through the suction chamber (10) is an inner wall (31) and wherein the tangential interface is between the inner wall (31) and the outlet area (28) and together with the angled interface is configured to avoid blockage.

2. Device (1) according to claim 1, wherein the portion of the circumferential wall (30) facing an upstream direction of flow through the suction chamber (10) is an inner wall (31) and characterized in that the inner wall (31) comprises a cross-section which is circular and comprises a defined radius.

3. Device (1) according to claim 1, characterized in that at the outlet area (28) a middle negative pressure zone (51) is surrounded by an outer negative pressure zone (52), wherein pressure in the middle negative pressure zone (51) is lower than pressure in the outer negative pressure zone (52) wherein the outer negative pressure zone (52) is between the middle negative pressure zone (51) and the circumferential wall (30) and wherein the middle negative pressure zone (51) and the outer negative pressure zone (52) are configured to direct the flow through the middle of the suction element (20).

4. Device (1) of claim 1, wherein a cross section of the suction element (20) narrows between the inlet area (24) and the outlet area (28).

5. Device (1) according to claim 4, characterized in that starting from the narrowed area to the outlet area (28) the cross section of the suction element (20) increases again.

6. Device (1) according to claim 1, characterized in that the second portion of the circumferential wall (30) is planar.

7. Device (1) according to claim 1, characterized in that the second portion of the circumferential wall (30) is curved.

8. Device (1) according to claim 1, characterized in that at least one of the inlet area (24) and the outlet area (28) of the suction element (20) comprise a round cross section.

9. Device (1) according to claim 1, characterized in that the suction element (20) is configured with a pipe (21) between the inlet area (24) and the outlet area (28) wherein particularly the pipe (21) comprises a round cross section.

10. Device (1) according to claim 1, characterized in that the suction element (20) is a flexible part from metal wherein the flexible part is configured from four metal band elements (20a, 20b, 20c, 20d), which are assembled with one another.

11. Device (1) according to claim 1, characterized in that the inlet area (24) comprises an increasing cross section towards the suction space (4), which is funnel-like.

12. Device (1) according to claim 1, characterized in that a sealing means (40) is assembled at the suction chamber (10) and is closing the suction chamber (10), wherein the suction element (20) extends with its outlet area (28) through the sealing means (40).

13. Device (1) according to claim 12, characterized in that the suction element (20) comprises a foot (22), which is assembled underneath the sealing means (40), wherein the foot (22) is configured to attach the suction element 20 to the suction chamber 10.

14. Device (1) according to claim 13, characterized in that the suction element (20) is moveable along the sealing means (40), wherein the position of the suction element (20) is variably adjustable at the suction chamber (10).

15. Device (1) according to claim 1, characterized in that the suction element (20) is configured to remove waste products (2) from plastic paper or a film.

16. Device (1) according to claim 1, characterized in that at least one of the inlet area (24) and the outlet area (28) of the suction element (20) comprise a rectangular cross section.

17. Device (1) according to claim 1, characterized in that the suction element (20) is configured with a pipe (21) between the inlet area (24) and the outlet area (28) wherein particularly the pipe (21) comprises a rectangular cross section.

18. Device (1) configured to suction waste products (2) of a production machine (3), which are configured as continuous stripes, with a suction chamber (10) at which at least a suction element (20) is assembled which extends into a suction space (4) which is outside the suction chamber (10) in order to convey waste products (2) into the suction chamber (10), wherein the suction element (20) comprises an inlet area (24), which is facing the suction space (4) and an outlet area (28), which ends in the suction chamber (10)

characterized in that the suction element (20) comprises a circumferential wall (30) that interfaces with the suction chamber (10) tangentially over a first portion of the circumferential wall (30) facing an upstream direction of flow through the suction chamber (10) and that interfaces with the suction chamber (10) at an angle between 20-70 degrees over a second portion of the circumferential wall (30) facing a downstream direction of flow through the suction chamber (10), wherein the tangential interface together with the angled interface is configured to avoid blockage and wherein the tangential interface together with the angled interface is configured to create at the outlet area (28) a middle negative pressure zone (51) that is surrounded by an outer negative pressure zone (52), wherein pressure in the middle negative pressure zone (51) is lower than pressure in the outer negative pressure zone (52), wherein the outer negative pressure zone (52) is between the middle negative pressure zone (51) and the circumferential wall (30) and wherein the middle negative pressure zone (51) and the outer negative pressure zone (52) are configured to direct the flow through the middle of the suction element (20).

19. Device (1) of claim 18, wherein the circumferential wall (30) interfaces with the suction chamber (10) at an angle between 20-70 degrees over the portion of the circumferential wall (30) facing the downstream direction of flow through the suction chamber (10).

20. Device (1) of claim 18, wherein a cross section of the suction element (20) narrows between the inlet area (24) and the outlet area (28).

* * * * *